J. WHITEHEAD.
Potato-Slicer.
No. 228,708.  Patented June 8, 1880.
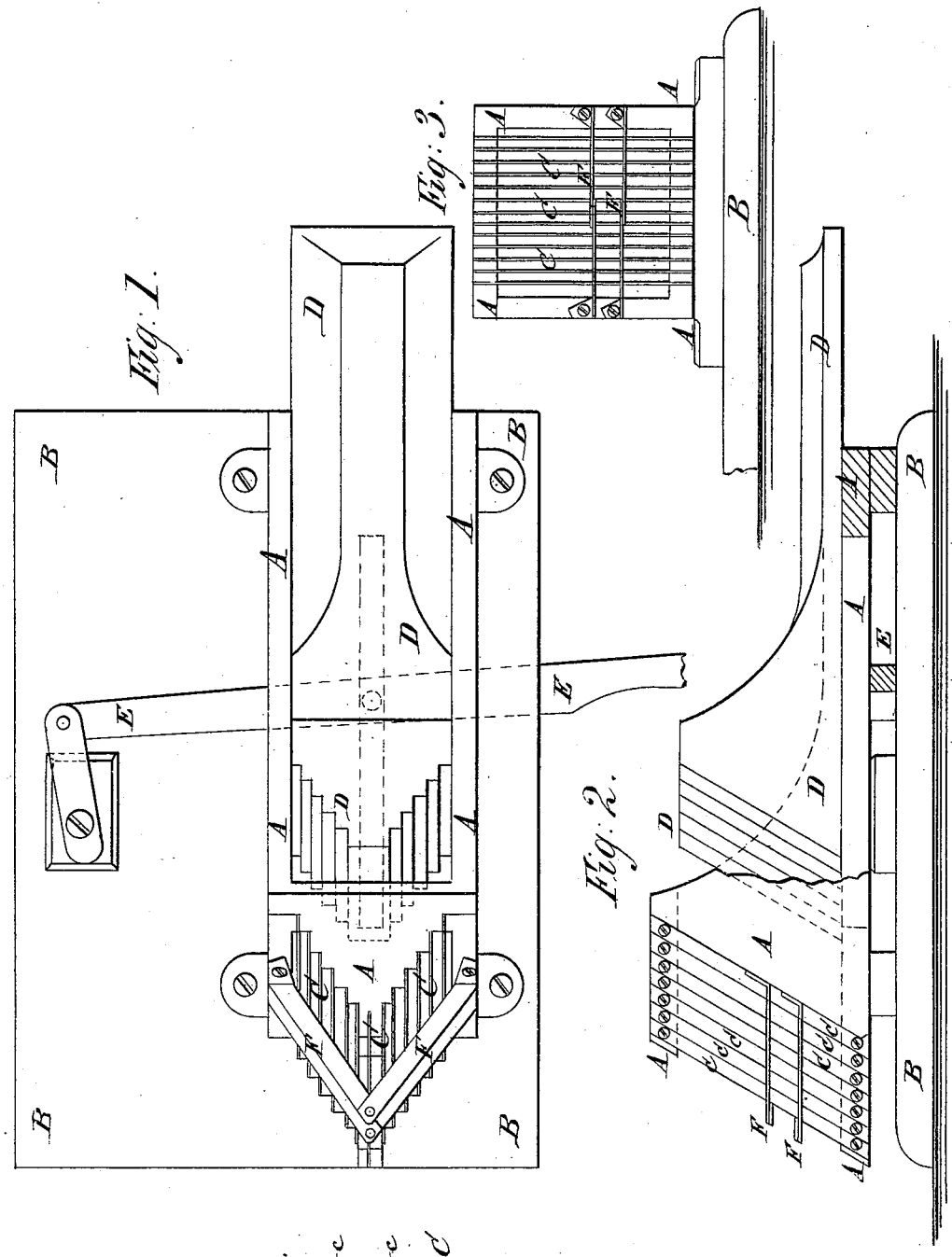
WITNESSES:
A. Schehl
C. Sedgwick
INVENTOR:
J. Whitehead
BY Munn & Co
ATTORNEYS.

UNITED STATES PATENT OFFICE.

JESSUP WHITEHEAD, OF LEADVILLE, COLORADO.

POTATO-SLICER.

SPECIFICATION forming part of Letters Patent No. 228,708, dated June 8, 1880.

Application filed November 20, 1879.

*To all whom it may concern:*

Be it known that I, JESSUP WHITEHEAD, of Leadville, in the county of Lake and State of Colorado, have invented a new and Improved Potato-Slicer, of which the following is a specification.

Figure 1 is a plan view of my improvement. Fig. 2 is a side elevation, partly in section. Fig. 3 is a front elevation. Fig. 4 is a side and edge view of a part of a knife.

The object of this invention is to furnish a simple and convenient machine for cutting potatoes and other vegetables into uniform slices and strips.

A is a light frame-work, of iron or other suitable material, which is attached to a board, B, or other suitable support. The lower or forward end of the bed-plate of the frame A is made V-shaped, and has its inclined edges rabbeted to form a series of shoulders or steps. The lower or forward edges of the side plates of the frame A are inclined to the rearward. The top plate of the frame A is made with a rabbeted V-shaped forward edge.

To the shoulders or steps of the forward ends of the bottom and top plates of the frame A are attached the ends of a series of knives, C. The knives C may be made with plain, grooved, or scalloped edges, as may be desired.

D is a follower-block, the lower or forward end of which is inclined, made V-shaped, and with rabbets or shoulders to correspond with the positions of the knives C, so that when the follower-block D is forced down its shoulders or steps may rest against the edges of the knives C.

The knives C have scallops c formed in their edges to give ornamental shape to the potato-slices. The knives C may be made with scollops c, so formed as to give a waving shape to the edges of the knives C, as shown in Fig. 4, or they may be made of other shapes, or plain, as may be desired.

In using the machine the follower-block D is raised, the potato or other vegetable to be sliced is dropped in to rest upon the edges of the knives C, and the follower-block D is forced down, pressing the potato against the knives C and cutting it into plain or fancy slices, according as plain or fancy knives C are used. The follower-block D is moved up and down by means of a lever, E, pivoted to it and to the support B, or by a rack, gear-wheel, and crank, or by some other suitable device.

As thus described the machine will cut the potatoes into slices; but it may be made to cut them into strips by attaching cross-knives F to the frame A, as shown in Figs. 1, 2, and 3.

If desired, the knives C F may all be cast in one piece; but I prefer to make them separate and detachable, so that they may be more readily sharpened when dull, and replaced should one or more of the knives be broken.

Having thus described my invention, I claim as new and desire to secure by Letters Patent—

1. The machine herein described, provided with a frame having a series of steps, the knives C, the cross-knives F, and the follower D, all combined and arranged to cut a vegetable into strips, as described.

2. A potato-slicer formed of the frame A, the V-shaped series of inclined knives C, and the stepped follower-block D, registering with the same, substantially as herein shown and described.

JESSUP WHITEHEAD.

Witnesses:
HENRY T. FULTON,
NELS BENJAMIN NELSON.